United States Patent [19]
Imamura et al.

[11] 3,832,392
[45] Aug. 27, 1974

[54] PROCESS FOR PRODUCING PERISOBUTYRIC ACID

[76] Inventors: Juichi Imamura, 460, Kojima-cho, Chofu-shi, Tokyo; Kyoichi Wakasa, 592-65, Jyosui-minamimachi, Kodaira-shi, Tokyo; Takeshiro Saito, 233,Kaminoge-machi, Tamagawa, Setagaya-ku, Tokyo; Tomeyoshi Ishikawa, 1583, Shimo-niikura, Yamato-machi, Kitaadachi-gun, Saitama-ken, all of Japan

[22] Filed: July 23, 1970

[21] Appl. No.: 57,806

[52] U.S. Cl............................................ 260/502 A
[51] Int. Cl............................................ C07c 73/10
[58] Field of Search...................... 260/502 R, 502 A

[56] References Cited
UNITED STATES PATENTS
3,268,431   8/1966   Urbanski et al................ 260/502 A FOREIGN PATENTS OR APPLICATIONS
997,284   7/1965   Great Britain.................. 260/502 A
690,920   7/1964   Canada........................... 260/502 A
732,225   4/1966   Canada........................... 260/502 A
628,832   2/1962   Belgium.......................... 260/502 A
864,803   4/1961   Great Britain.................. 260/502 A

*Primary Examiner*—Bernard Helfin
*Assistant Examiner*—W. B. Lone
*Attorney, Agent, or Firm*—Flynn and Frishauf

[57] ABSTRACT

Process for producing perisobutyric acid which comprises oxidizing isobutyraldehyde in an inert solvent under pressure of oxygen or an oxygen-containing inert gas from 2 to 50 kg./cm$^2$ and at a temperature from 10° to 80°C.

4 Claims, No Drawings

PROCESS FOR PRODUCING PERISOBUTYRIC ACID

BACKGROUND OF THE INVENTION

1. Field of the Invention

This invention relates to a process for producing perisobutyric acid which comprises oxidizing isobutyraldehyde in an inert solvent at a temperature from 10° to 80°C. and under oxygen pressure of 2 kg./cm.$^2$ or higher.

2. Description of the Prior Art

Isobutyraldehyde, which is a byproduct in the production of n-butyraldehyde by the oxo reaction of propylene, has found no effective use established despite its mass-production on an industrial scale. On the other hand, there is no report at all on the synthesis of perisobutyric acid by autoxidation of isobutyraldehyde, one of a group of percarboxylic acids which are widely used as important oxidizing agents, for example, in organic syntheses but have not been extensively investigated except a few such as peracetic and perbenzoic acids. Whereas British Patent 864,803 and Belgian Patent 628,823 describe processes for the production of percarboxylic acids by autoxidation of aldehydes, no examples are given therein describing oxidation of isobutyraldehyde.

SUMMARY OF THE INVENTION

As a result of our extensive studies on the autoxidation reaction of lower saturated aliphatic aldehydes, we have found that, unlike other aldehydes, isobutyraldehyde is converted to the per acid in a very high yields under increased oxygen pressure without the use of any catalyst. Experiments were made with various aldehydes at an aldehyde concentration of 20 percent by weight using acetone as a solvent: Acetaldehyde at a reaction temperature of 20°C. and an oxygen partial pressure of 1 kg./cm.$^2$ (atmospheric pressure) gave an acetaldehyde reaction ratio of 58 percent and a peracetic acid selection ratio of 38 percent and even at a reaction temperature of 30°C. and an oxygen partial pressure of 10 kg./cm.$^2$ gave a reaction ratio of 82 percent and a selection ratio of only 52 percent. Propionaldehyde at a reaction temperature of 30°C. and an oxygen pressure of 5 kg./cm.$^2$ gave a reaction ratio of 88 percent and a perpropionic acid selection ratio of 43 percent and even at an elevated oxygen pressure of 15 kg./cm.$^2$ gave a perpropionic acid selection ratio of only 49 percent with the same reaction ratio. Normal butyraldehyde at a reaction temperature of 30°C. and an oxygen pressure of 5 kg./cm.$^2$ a normal perbutyric acid selection ratio of 56 percent and, at a reaction pressure of 10 kg./cm.$^2$, a normal perbutyric acid selection ratio of 61 percent, both with a reaction ratio of 75 percent. In these cases, higher or lower reaction temperature than 30°C. did not lead to increase in the peracid selection ratio, rather showed a tendency of slightly decreasing the peracid selection ratio. On the contrary, it is surprising that use of isobutyraldehyde as the starting material produces results far better than with other lower aliphatic aldehydes as apparently shown in the table below. The table indicates the results of experiments in which 150 g. of the reaction mixture (using acetone as the solvent) were placed in a 400-ml. SUS 32 (stainless steel containing less than 0.08 percent of carbon, less than 1.00 percent of silicon, less than 2.50 percent of manganese, less than 0.04 percent of phosphorus, less than 0.03 percent of sulfur, 10.00–14.00 percent of nickel, 17.00–19.00 percent of chromium and 1.75–2.75 percent of molybdenum) stainless steel autoclave and subjected to oxidation with a rate of stirring of 1200 r.p.m. until oxygen is no longer absorbed, the reaction ratio of isobutyraldehyde being over 90 percent in every case.

| Concentration of isobutyraldehyde (weight %) | Reaction temperature (°C) | Oxygen pressure (kg./cm.$^2$) (gauge pressure) | Reaction time (min.) | Yield of perisobutyric acid (mol. %) |
|---|---|---|---|---|
| 20 | 35 | 2 | 39 | 74 |
| do. | do. | 5 | 35 | 86 |
| do. | do. | 10 | 30 | 89 |
| do. | do. | do. | 50 | 85*$^1$ |
| do. | do. | 20 | 22 | 90 |
| do. | 20 | 10 | 62 | 87 |
| do. | 50 | do. | 18 | 92 |
| do. | 65 | do. | 13 | 62 |
| 30 | 30 | 2.5 | 41 | 69 |
| do. | 35 | 5 | 37 | 88 |
| do. | 50 | 10 | 18 | 82 |
| 10 | do. | do. | 21 | 91 |
| (Reference experiment) | | | | |
| 20 | 20 | atmospheric | 70 | 19*$^2$ |
| do. | 30 | do. | 61 | 32*$^3$ |
| do. | 50 | do. | 32 | 21*$^4$ |

*$^1$ Experiment was made in a tefrone-coating autoclave.
*$^{2-4}$ Experiments were made in a 500 ml. glass reaction vessel at an atmospheric pressure under oxygen. Reaction ratios of isobutyraldehyde and selection ratios of perisobutyric acid from the reacted isobutyraldehyde were 64, 64 and 65% and 30, 50 and 32%, respectively.

As the inert solvent employed in the process of this invention are mentioned lower ketones, hydrocarbons and lower esters of a lower fatty acid, acetone and ethyl acetate being particularly preferable. Too low a portion of the solvent used is disadvantageous in that the yield of perisobutyric acid will be decreased and control of the reaction will be difficult, whereas too high a portion will result in decrease in the rate of oxidation as well as in reduction of the productivity. The optimum concentration more or less depends upon the reaction pressure and the reaction temperature. The portion of the solvent used is appropriately determined in consideration of the above-cited factors and usually from 1.5 to 10 times the weight of the isobutyraldehyde starting material employed.

The reaction temperature is from 10° to 80°C., and preferably from 15° to 50°C. especially in a batch reaction. However, slightly higher temperatures are suitable in a continuous reaction, being most preferably in a range from 35° to 80°C. Higher or lower temperature than the ranges mentioned above may be employed for the oxidation. However, too low a temperature is disadvantageous in that the rate of oxidation will be small and the selection ratio of perisobutyric acid will also be lowered. Too high a temperature will produce a tendency to explode and largely lower the selection ratio of perisobutyric acid due to its increased decomposition.

As the pressure of oxygen, which may be an inert gas containing oxygen, is employed a pressure from 2 to 50 kg./cm.$^2$, and especially preferable from 2 to 20 kg./cm.$^2$ The optimum oxygen pressure is more or less dependent upon the reaction temperature and the nature and amount of solvent. Despite almost no effect of oxygen partial pressure produced when it is about 1.5 kg./cm.$^2$, it surprisingly produces a remarkable effect when it is 2 kg./cm.$^2$ Increase in oxygen pressure from 2 kg./cm.$^2$ to 5 kg./cm.$^2$ causes increase in the yield of perisobutyric acid over a wide range of the reaction temperature at a wide range of the aldehyde concentration. On the other hand, at an oxygen pressure between 5 kg./cm.$^2$ and 20 kg./cm.$^2$, there is produced almost no increase in the yield of perisobutyric acid. Further increase in the oxygen pressure has been observed to make control of the reaction difficult when the reaction temperature or concentration of isobutyraldehyde is high. Thus, an oxygen pressure from about 2 to about 20 kg./cm.$^2$ is especially preferable.

The process of this invention may be conducted either in batch or continuous process. As the gaseous oxidizing agent is used oxygen or an oxygen-containing gas such as, for example, air or a mixture of air and oxygen.

Separation of perisobutyric acid from the reaction product may be easily carried out by distillation under reduced pressure or other conventional means. It may be convenient in most cases to use the residue from removal of the unreacted isobutyraldehyde and the solvent from the oxidation solution as it is as the oxidation solution.

DESCRIPTION OF PREFERRED EMBODIMENTS

The examples which follow are submitted to illustrate and not to limit this invention.

EXAMPLE 1

In a 300-ml. SUS 32 autoclave equipped with a stirrer, a reflux condensor, a thermometer and a gas inlet were placed 40 g. of isobutyraldehyde and 120 g. of acetone. Oxygen gas was introduced into the mixture to a pressure of 10 kg./cm.$^2$ (gauge pressure) with vigorous stirring at 1200 r.p.m. while maintaining the temperature at 30°–35°C. Oxygen gas was continuously supplemented to maintain the reaction pressure at 10 kg./cm.$^2$ as the oxidation reaction proceeded which consumed oxygen to reduce the reaction pressure. After the reaction was conducted for 30 min. the reaction mixture was analyzed to find almost none of the unreacted isobutyraldehyde, 52 g. of perisobutyric acid and 4.8 g. of isobutyric acid.

EXAMPLE 2

Using the same reaction vessel as in Example 1, a mixture of 30 g. of isobutyraldehyde and 120 g. of ethyl acetate was subjected to an oxidation reaction at a pressure of 13 kg./cm.$^2$ by the introduction of air with vigorous stirring at 1,200 r.p.m. while maintaining the temperature at 20°–22°C. As the oxidation reaction proceeded, the oxygen was consumed to reduce the reaction pressure. Thus, oxygen was continuously supplemented to maintain the oxygen partial pressure between 2.7 and 2.8 kg./cm.$^2$ throughout the reaction. After the reaction was conducted for 50 min. the reaction mixture was analyzed to find 5.5 g. of the unreacted isobutyraldehyde, 31.0 g. of perisobutyric acid and 3.4 g. of isobutyric acid.

EXAMPLE 3

Using the same reaction vessel as described in Example 1, a mixture of 20 g. of isobutyraldehyde, 80 g. of methyl isobutyrate, 50 g. of ethyl isobutyrate and 50 g. of acetone was subjected to an oxidation reaction at an oxygen pressure of 5 kg./cm.$^2$ (gauge pressure) with vigorous stirring at 1,200 r.p.m. while maintaining the temperature at 40°–42°C. As the oxidation reaction proceeded the oxygen was consumed to reduce the reaction pressure. Thus, oxygen was continuously supplemented to maintain the pressure at 2.5 kg./cm.$^2$ (gauge pressure) throughout the reaction. After the reaction was conducted for 20 min. the reaction mixture was analyzed to find 2.1 g. of the unreacted isobutyraldehyde, 19.4 g. of perisobutyric acid and 5.3 g. of isobutyric acid.

EXAMPLE 4

Using the same reaction vessel as described in Example 1, a mixture of 20 g. of isobutyraldehyde, 50 g. of methylethylketone, 50 g. of benzene and 50 g. of ethyl acetate was subjected to an oxidation reaction at an oxygen pressure of 15 kg./cm.$^2$ (gauge pressure) with vigorous stirring at 1,200 r.p.m. while maintaining the temperature between 26 and 29°C. As the oxidation reaction proceeded the oxygen was consumed to reduce the reaction pressure. Thus oxygen was continuously supplemented to maintain the pressure at 15 kg./cm.$^2$ (gauge pressure) throughout the reaction. After the reaction conducted for 20 min. the reaction mixture was analyzed to find 7.8 g. of the unreacted isobutyraldehyde, 12.7 g. of perisobutyric acid and 4.0 g. of isobutyric acid.

EXAMPLE 5

Into a jacketed SUS 32 bubbling tower 25 mm. in inner diameter and 460 ml. in inner volume, an acetone solution containing 15 percent by weight of isobutyraldehyde was introduced from the bottom at a rate of 230 ml./min. Oxygen was introduced at a rate of 40 ml./min. through a perforated plate with 50 holes 0.4 mm. in diameter uniformly distributed located below the inlet of the starting material. The reaction pressure and temperature were maintained at 20 kg./cm.$^2$ and 70°C., respectively. The product discharged from the reaction vessel was separated into a liquid phase and a gas phase by means of a gas separator chilled at 5°C. There were obtained 191 g. of a perisobutyric acid solution per minute. The product solution was analyzed to find 16 percent by weight of perisobutyric acid, 1.8 percent by weight of isobutyric acid and 2.6 percent by weight of the unreacted isobutyraldehyde.

We claim:

1. Process for producing perisobutyric acid which comprises oxidizing isobutyraldehyde in an inert solvent selected from the group consisting of acetone, ethyl acetate, methyl ethyl ketone, benzene and a mixture thereof under pressure of oxygen or an oxygen-containing inert gas of from 2 to 50 kg/cm$^2$ and at a temperature of from 35°C. to 80°C. in the absence of a catalyst.

2. Process according to claim 1 wherein the pressure of oxygen is from 2 to 20 kg/cm$^2$.

3. Process according to claim 1 wherein acetone or ethyl acetate is used as the inert solvent.

4. Process according to claim 1 wherein isobutyraldehyde is reacted at a concentration from 10 to 40 percent by weight.

* * * * *

UNITED STATES PATENT OFFICE
CERTIFICATE OF CORRECTION

Patent No. 3,832,392     Dated August 27, 1974

Inventor(s) JUICHI IMAMURA et al

It is certified that error appears in the above-identified patent and that said Letters Patent are hereby corrected as shown below:

Title page, under paragraph "[76] Inventors" - rewrite

"Kyoichi Wakasa" as --- Ryoichi Wakasa --- .

Title page, after paragraph "[76] Inventors" - insert

--- [73] Assignee: ASAHI KASEI KOGYO KABUSHIKI KAISHA,

Osaka, Japan --- .

Title page, after paragraph "[21] Appln. No." - insert

--- [30] Foreign Application Priority Data

July 31, 1969    Japan..........44-60192 --- .

Column 4, line 27 - before "conducted", insert --- was --- .

Signed and sealed this 15th day of April 1975.

(SEAL)
Attest:

RUTH C. MASON           C. MARSHALL DANN
Attesting Officer       Commissioner of Patents
                             and Trademarks